United States Patent [19]
Azuma

[11] 3,924,494
[45] Dec. 9, 1975

[54] AUTOMATIC BAR FEEDING APPARATUS

[75] Inventor: Shiro Azuma, Kokubunji, Japan

[73] Assignee: Azuma Engineering Co., Ltd., Tokyo, Japan

[22] Filed: June 25, 1974

[21] Appl. No.: 483,060

[52] U.S. Cl. ................................. 82/2.7; 214/1.2
[51] Int. Cl.² .................... B23B 13/00; B23Q 5/22
[58] Field of Search ........... 82/2.5, 2.7; 214/1.1, 1.2

[56] References Cited
UNITED STATES PATENTS

| | | | |
|---|---|---|---|
| 2,906,003 | 9/1959 | Lakins et al. | 214/1.2 |
| 3,066,806 | 12/1962 | Lakins et al. | 214/1.2 |
| 3,209,627 | 10/1965 | Holmes | 82/2.7 |
| 3,360,139 | 12/1967 | Bechler | 214/1.2 |
| 3,582,000 | 6/1971 | Werkmeister | 214/1.1 |
| 3,618,787 | 8/1971 | Nemoto | 82/2.7 |
| 3,799,363 | 3/1974 | Ross | 214/1.2 |
| 3,812,983 | 5/1974 | Wanner | 214/1.2 |

*Primary Examiner*—Harrison L. Hinson
*Attorney, Agent, or Firm*—Jones, Thomas & Askew

[57] ABSTRACT

An automatic bar feeding apparatus resulting from the improvement of the conventional type of automatic bar feeding apparatus, and consisting mainly of a new control device of a pusher, a pusher having an improved construction, an improved plate cam for introducing a bar material to the storage section, an improved detaching mechanism between the pusher and a bar material, and an guide section having an improved means for preventing oscillation.

3 Claims, 19 Drawing Figures

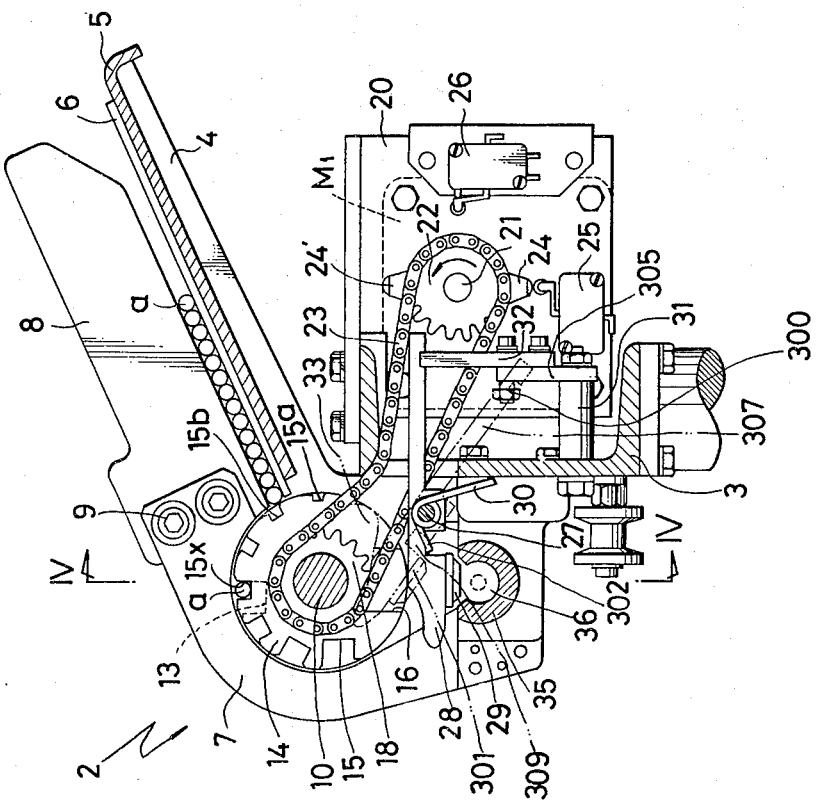
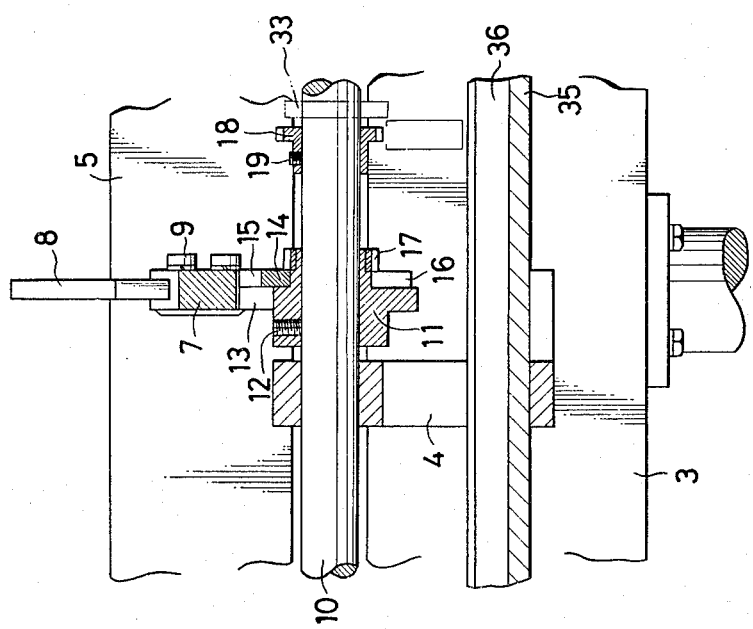

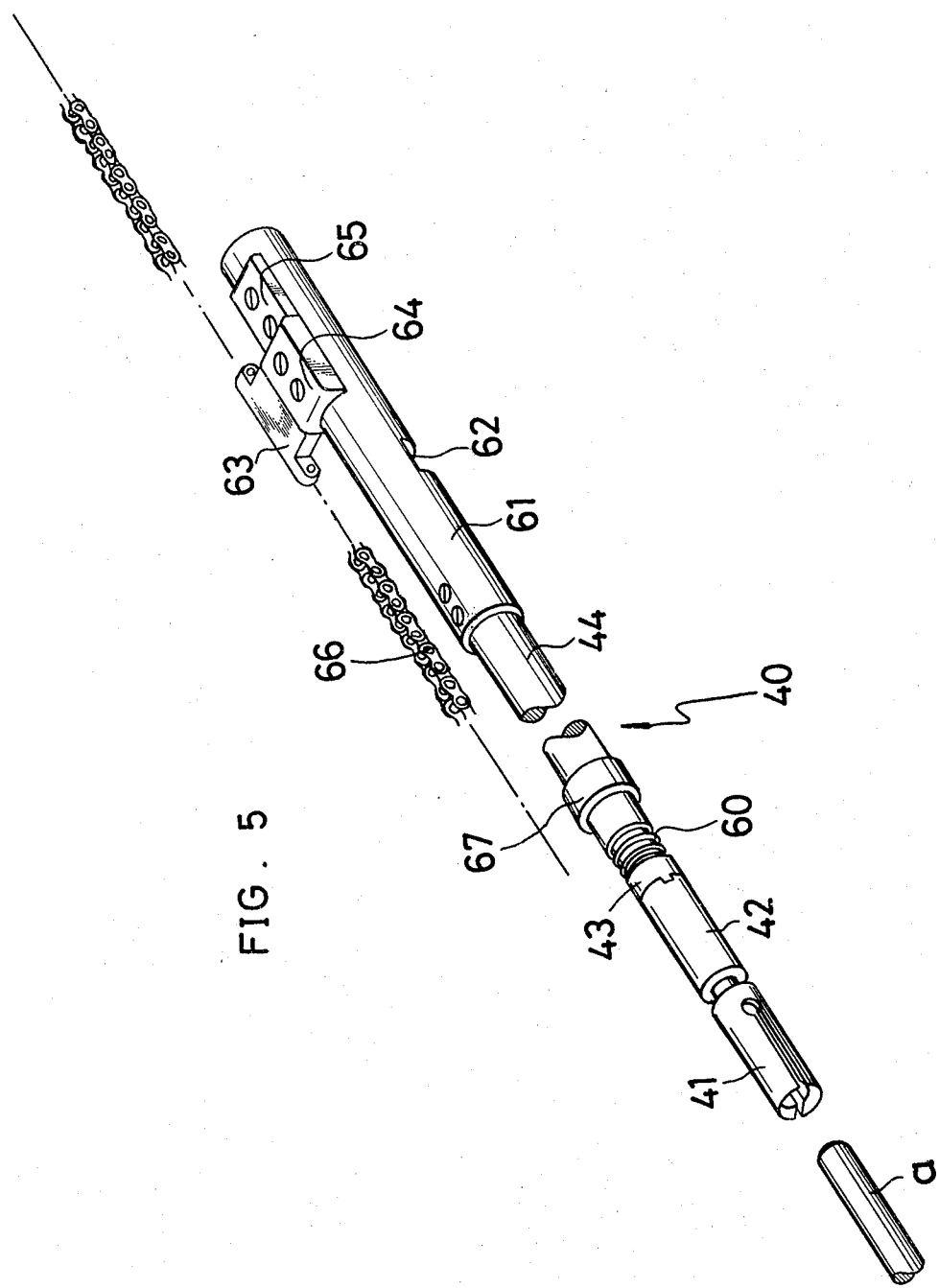

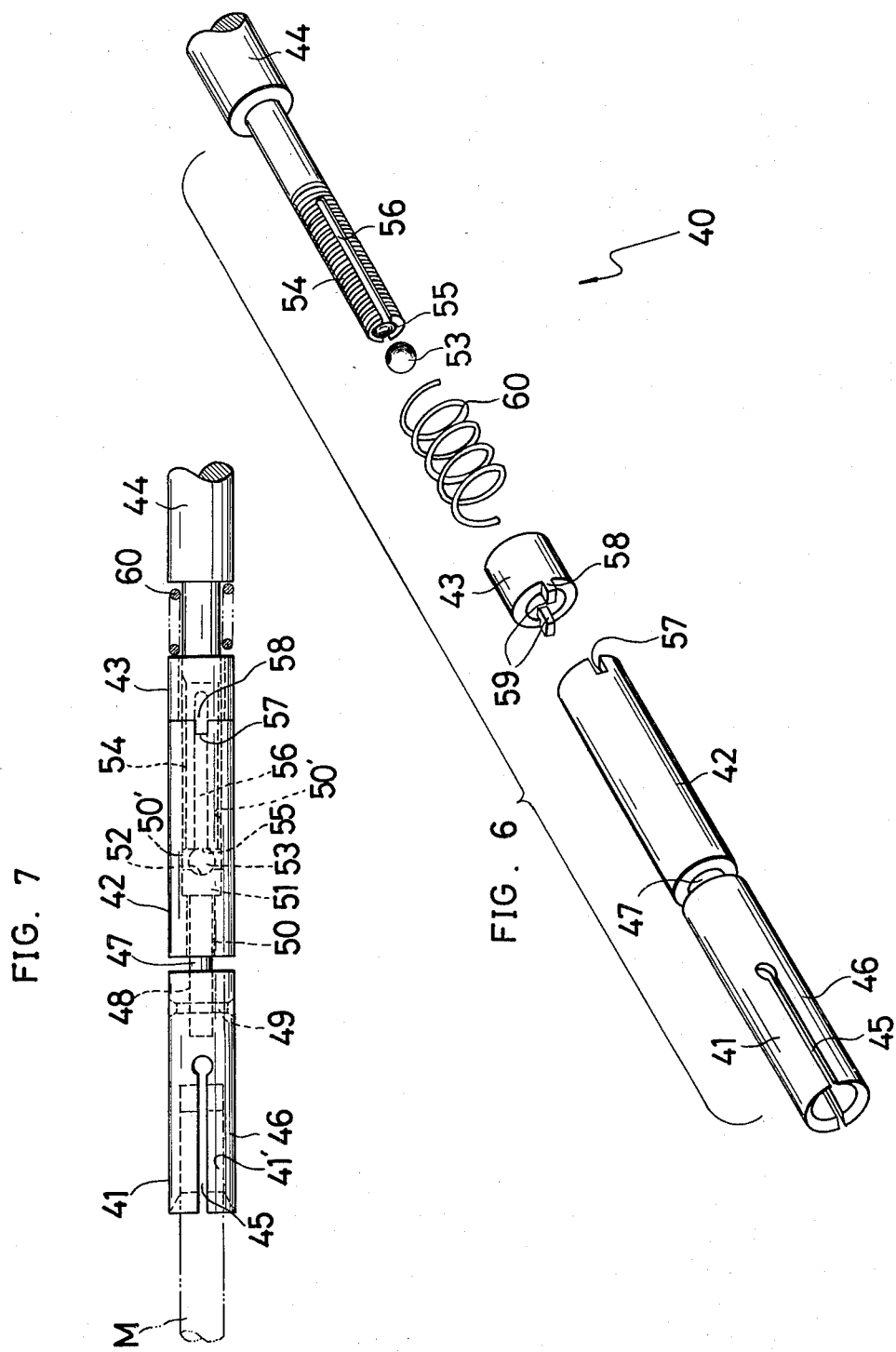

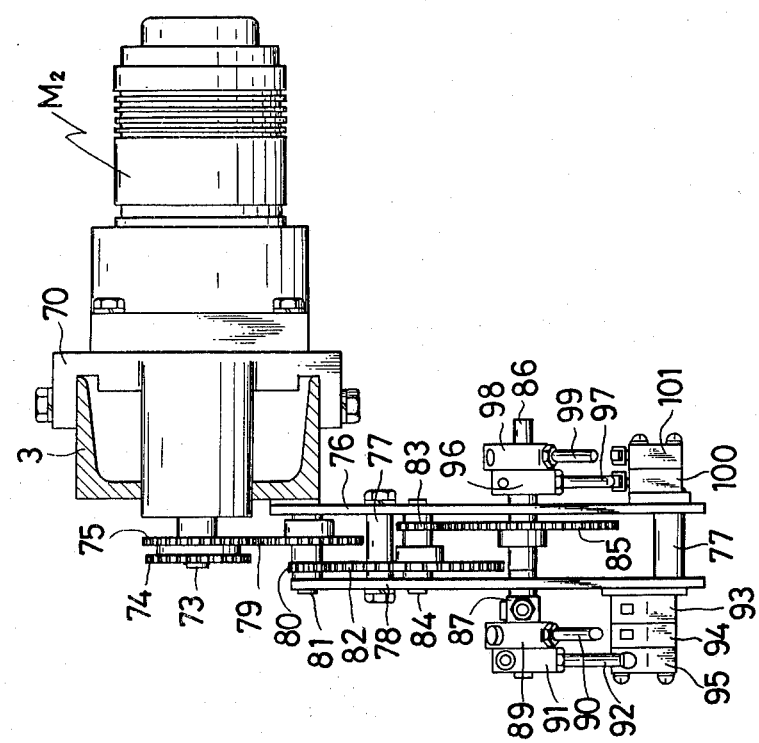
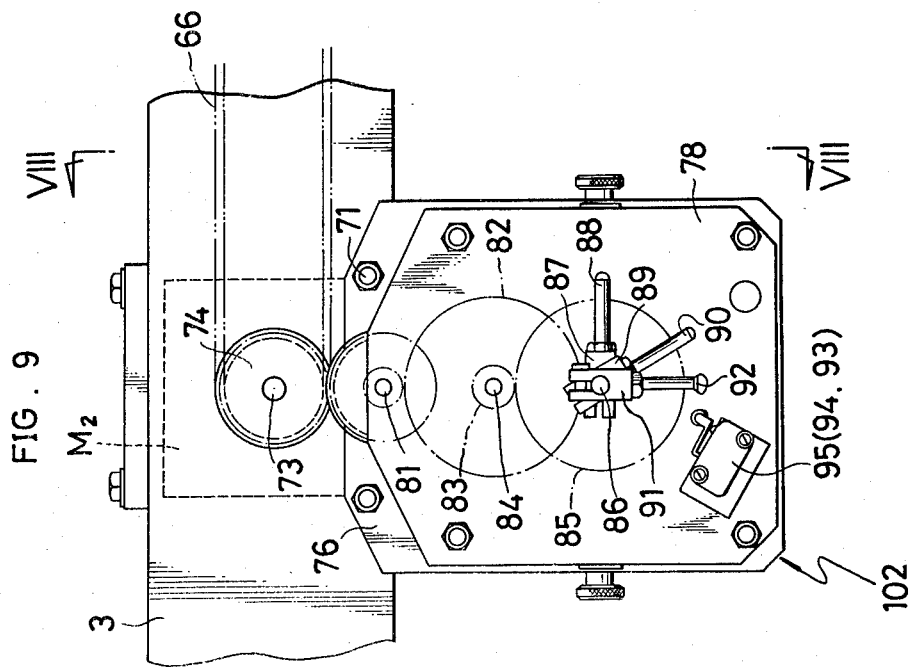

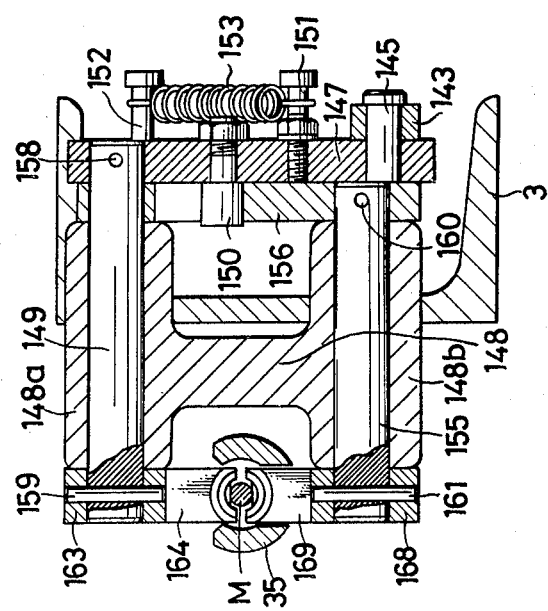
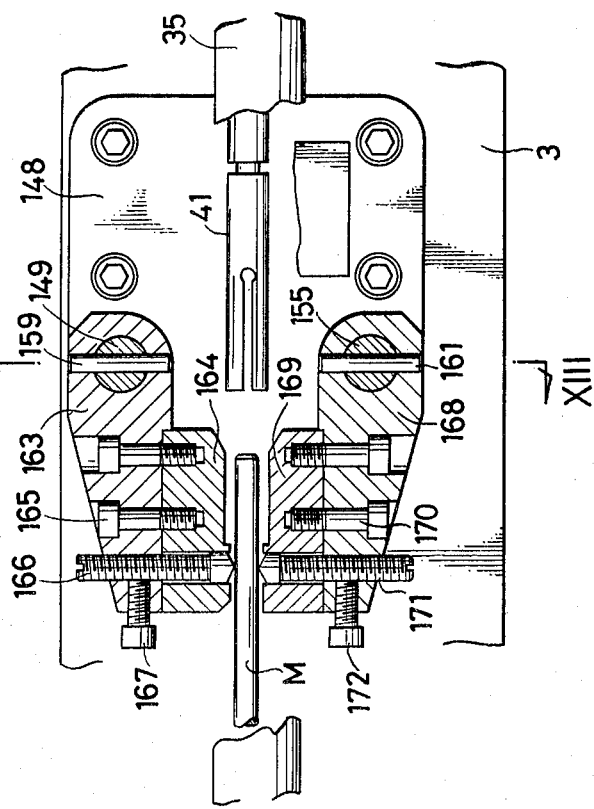

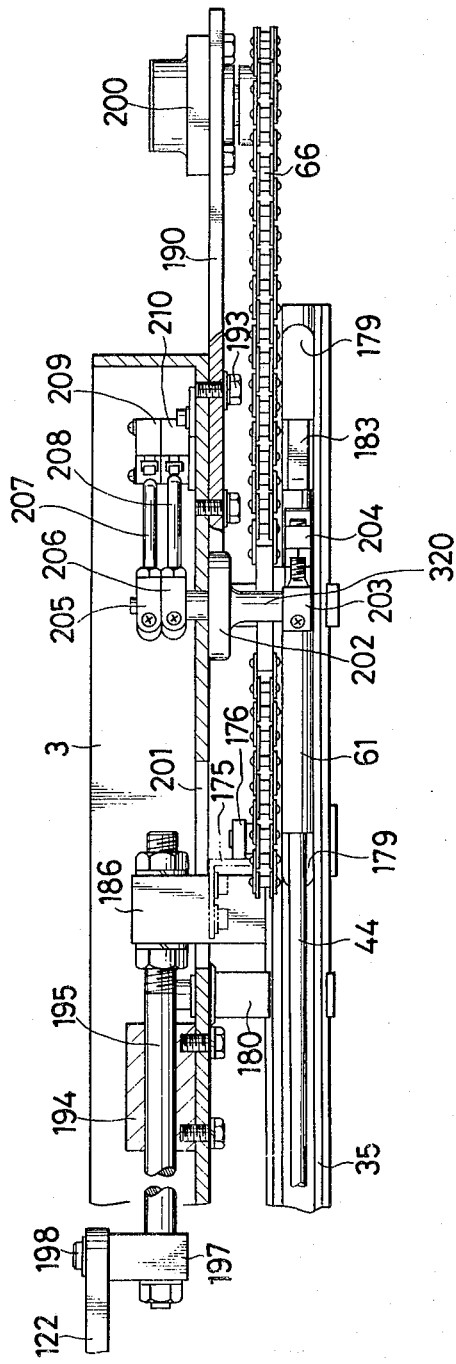
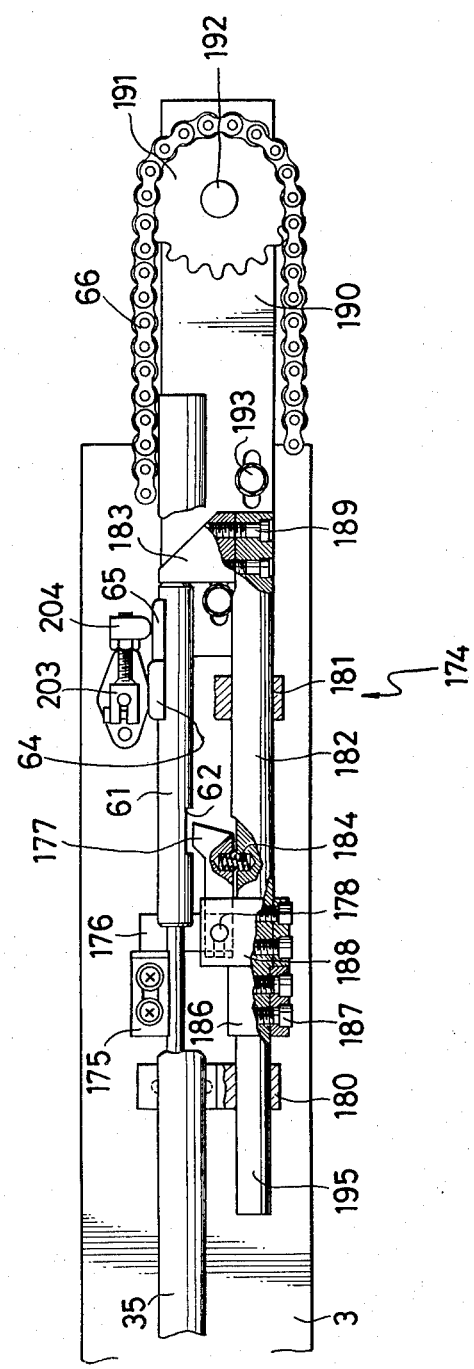

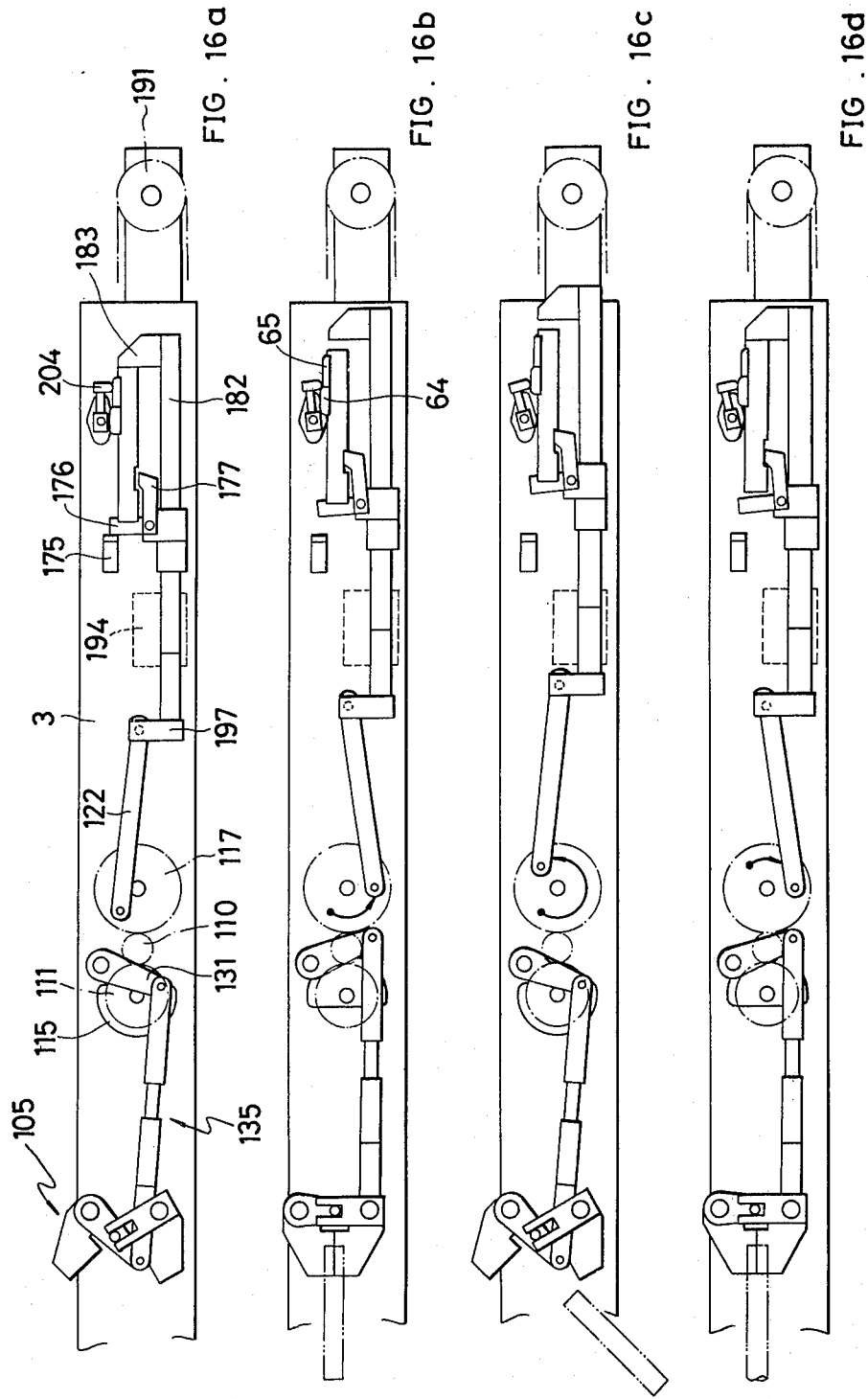

AUTOMATIC BAR FEEDING APPARATUS

BACKGROUND OF THE INVENTION

The automatic bar feeding apparatus for a machine tool with a fixed head stock exists from old times. A representative example thereof is U.S. Pat. No. 2,495,522. Recently, an automatic bar feeding apparatus with a movable head stock was developed. British Patent No. 1,322,923 can be given as a representative example thereof.

The conventional type of bar feeding apparatus used for a machine tool with a movable head stock is provided with an electric switch for bringing back a pusher from its foremost position, wherewith the pusher is engaged. Hence, when the lengths of bar materials are different, or when the lengths of products vary, the aforesaid electric switch is moved. In this structure, however, it is difficult to adjust the move of the aforesaid switch. Therefore, it has been put into practice only when mainly short products were to be produced.

In the conventional type of bar feeding apparatus, in addition, the pusher has consisted of a push rod jointed with a joint section by means of a bolt. In the meantime, two types of machine tool have been available: clockwise and anticlockwise revolution types; hence, it has been necessary to prepare two sets of pushers for clockwise and anticlockwise revolution types. In order to introduce one bar material from the bar material storage section to the guide section in the conventional type of automatic bar feeding apparatus, a concave section has been provided in one cam plate, allowing a bar material to be introduced through this concave section, since pushers have been prepared for each bar material diameter. Accordingly, there has been a defect that many cam plates should be prepared for bar materials of different diameters. This has been very disadvantageous from an economical point of view.

In the conventional type of automatic bar feeding apparatus, moreover, the driving mechanism has been utilized simultaneously for detaching the pusher from a bar material. This would entail inaccuracy of work.

In the conventional apparatus, in addition, the guide section whereunto the pusher with a bar material is guided has not been provided with a preferable mechanism for preventing oscillation.

SUMMARY OF THE INVENTION

This invention has facilitated control from the above-mentioned standpoint by replacing the movement of the pusher into one synchronizing circular moving mechanism. Moreover, a lock piece is provided between the push rod and the joint section so as to allow work by means of one pusher for a machine tool of either clockwise or anticlockwise revolution type.

Further, boss plates are provided in addition to the plate cam and a desired concave section is provided combining the concave sections of these plates so as to introduce a bar material from the storage section to the guide section.

Furthermore, an independent driving mechanism is provided in order to detach the pusher from a bar material.

Finally, a preferable means for preventing oscillation which opens and closes the guide section is proposed.

DETAILED DESCRIPTION OF THE INVENTION

The invention relates to an automatic bar feeding mechanism which can widely be utilized in an automatic lathe of the so-called movable head stock type whereof head stock moves, an automatic lathe of the so-called fixed head stock type whereof head stock is fixed and the like, or the other machine tools of these types, and the other equipments. Bar feeding mechanism of these types have a horizontal frame usually supported by a strut as the supporting body of the apparatus. As the main mechanisms supported by this frame, the so-called take-out mechanism which takes out bar materials from their storage section to the guide section of bar materials, the so-called sending mechanism and pusher which sends to a machine tool or the like the bar material taken out to the aforesaid guide section, the so-called detaching mechanism which detaches bar materials from the pusher, and other mechanisms.

BRIEF DESCRIPTION OF THE DRAWINGS

FIG. 3 and FIG. 4 are respectively an enlarged side sectional view, taken along line III—III of FIG. 1; and an enlarged front sectional view of the aforesaid bar member take-out mechanism taken along line IV—IV of FIG. 3.

FIG. 5, FIG. 6 and FIG. 7 are schematic diagrams illustrating the structure of the pusher.

FIG. 8, which is a section view along line VIII—VIII of FIG. 9, and FIG. 9 show the substantial control mechanisms which control the foremost and rearmost positions of bar materials, the torque adjusting position following working start, and other movements of the pusher.

FIG. 12 and FIG. 13, which is a section view taken along line XIII—XIII of FIG. 12, show the detail of the operation of the rocker arm.

FIG. 14 and FIG. 15 are the schematic diagrams illustrating the reciprocating mechanism of the pusher.

FIG. 16a, FIG. 16b, FIG. 16c and FIG. 16d are schematic diagrams illustrating the detail of the operation of the pusher. Namely, FIG. 16a shows the starting state of sending a bar material M toward the spindle of a machine tool after the bar material M has been taken into the hollow section 36 of the sending tube 35 and the rear end section of the bar material M has been picked up by the finger section 41 at the end of the pusher 40.

FIG. 16b shows the state where the remaining material M is being pulled back to the rear of the feeding apparatus when the working limit has been reached.

FIG. 16c shows the state where the remaining material pulled out of the finger section 41 is falling.

FIG. 16d shows the state where a new bar material M is picked up and being pressed into the finger section 41.

DETAILED DESCRIPTION OF THE PREFERRED EMBODIMENTS

Figure 1:
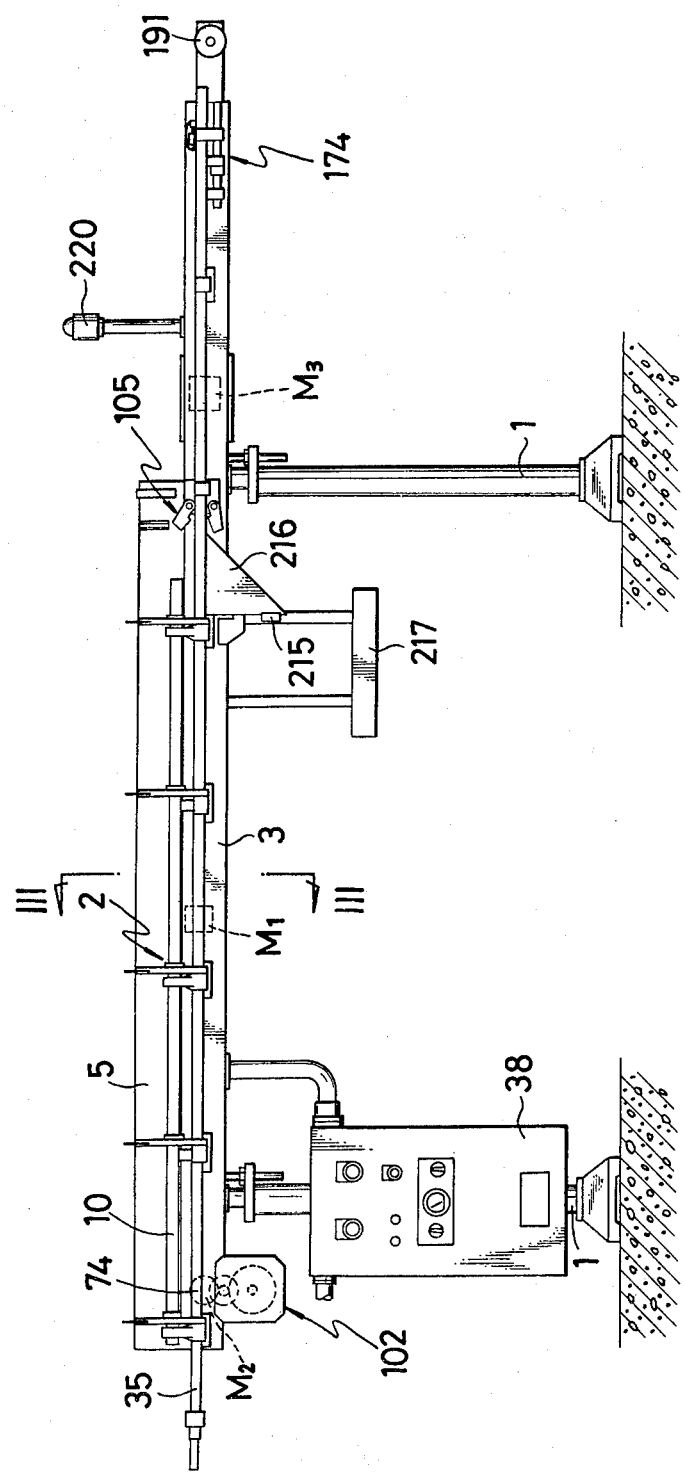
FIG. 1 is a general front view of the automatic bar feeding apparatus wherein the invention is embodied.
Figure 2:
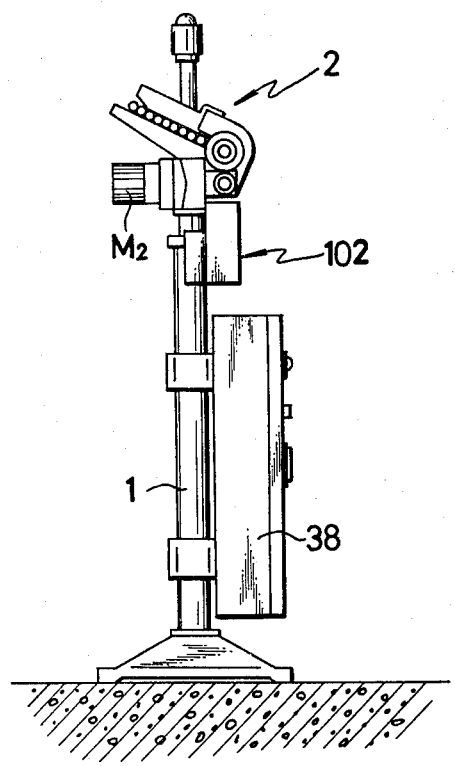
FIG. 2 is a general side view of the automatic bar feeding apparatus wherein the invention is embodied.

With reference now to the drawings and more particularly to FIG. 1 and FIG. 2 thereof, there are illustrated a plural number of struts 1 which are provided to support a horizontal frame 3. Bar materials are stored on a tray 5, while mechanisms 2 take out bar materials one by one from the tray 5 into a sending tube 35, and five such mechanisms 2 are provided in FIG. 1. A control panel 38 provided on a strut 1 accommodates a mechanism for the remote control of the movement of a pusher or a bar material of the apparatus according to the invention. M1 is a motor to drive the mechanism 2 which takes out bar materials, M2 a motor which drives the pusher to send bar materials, and M3 a detachment motor to detach bar materials from the pusher. 102 is a control mechanism which will be described later on, 105 the so-called material holding/releasing mechanism which combines a bar of material with the pusher or separates the one from the other, 174 an operating section which will be described in detail later on, 216 a chute wherethrough remaining materials are ejected, and 215 a microswitch to drive the driving motor M1 after confirming the ejection of remaining materials.

FIG. 3 and FIG. 4 show the detail of the aforesaid mechanism which takes out bar materials. A tube holder 4 is supported on the aforesaid frame 3, a rail 6 is provided on the aforesaid tray 5 to receive bar materials, a keep plate 8 is provided in parallel with the rail 6 so as to arrange a number of bar materials a in a row on the rail 6, and a take-out axis 10 which is furnished with a boss 11 by means of a screw 12 is rotatably supported on the tube holder 4. Although five of the above-mentioned mechanisms 2 are provided at appropriate intervals, one of these mechanisms will be described in the following detail, since they have the same construction. A round plate cam 14 is mounted on the boss 11 by means of a screw 17. And it is provided with a number of concave sections $15a$, $15b$, ..., $15x$ of different diameters on its circumference. Part of the boss 11 is so formed as to be of the same diameter as that of the plate cam 14 and is provided on its outer circumference with at least one of the concave sections 13 of the same diameter as the largest of the diameters of a number of concave sections $15a$, $15b$, ..., $15x$ which are provided on the plate cam 14. Further, part thereof is provided with a notch groove 16 to facilitate engaging the axis 10 with the boss 11. A guide 7 surrounds the outer diameter of the plate cam 14, holding a little clearance therebetween.

The lower section of the guide 7 is fixed on the tube holder, while the upper section thereof is firmly connected with the keep plate 8 by means of bolts 9. A sending tube 35 supported by the tube holder 4 in the lower section of the guide 7 is a circular hollow section which serves as the conveyance channel of bar materials $a$. A sprocket 18 is mounted on the take-out axis 10 by means of a screw 19, a chain 23 couples the sprocket 18 with the output axis 21 of the take-out motor M1, and levers 24 and 24' for operating a switch fixed on the output axis 21 of the take-out motor M1 are provided so as to protrude above the chain 23. Microswitches 25 and 26 are provided on the bracket 20 of the take-out motor M1, and the circuit of the motor M1 is opened to stop the motor M1 when the microswitch 25 comes into contact with the switch operating lever 24, while the aforesaid detachment motor M3 is started when the microswitch 26 comes into contact with the operating lever 24'.

An axis 27 is rotatably provided on the frame 3, and a plate 29 covers the tube 35. A plate 29 is used for preventing a bar of material a (FIG. 5) within the tube 35 from oscillating, and it is referred to as oscillation preventing plate. An arm 28 is provided with the aforesaid oscillation preventing plate 29 in the lower section, and a concave section 301 is provided in the upper section of the base thereof, while an engaging section 302 is provided in the lower section. A return spring 30 is provided on the axis 27, and it is reinforced so that part thereof may be engaged with the above-mentioned engaging section 301 and the other part thereof may come into contact with the frame 3 to open the oscillation preventing plate 29 from the tube 35. A rotary axis 31 is provided in a portion of the frame 3, an operating piece 32 is oscillatably provided on the rotary axis 31 through the intermediary of a supporting lever 305, and a notch 308 provided on one side of an operating lever 307 is engaged with a supporting lever 310 provided on the operating piece 32, while a notch 309 provided on the other side is engaged with the concave section 301 of the operating arm 28.

It is clear that the following can be understood from the above description. To feed a bar material corresponding to $15x$ of a number of concave sections of the plate cam 14, for example, the concave section 13 of the boss 11 is combined with the concave section $15x$ of the plate cam 14. This combination can be established by loosening the screw 17 to allow the plate cam 14 to rotate and by fixing the plate cam 14 on the boss 11 by means of the screw 17 when the aforesaid concave section $15x$ comes just above the concave section 13. In this state, all of the other concave sections of the cam 14 are blocked by the body of the boss 11. When the motor M1 revolves in this state, the chain 23 operates, the axis 10 rotates, and when the concave section consisting of the aforesaid concave section 13 and the aforesaid concave section $15x$ one above the other coincides with the interval between the aforesaid rail 6 and the keep plate 8, the bar material a at the lowermost end on the rail 6 comes into the aforesaid duplicated concave section. Further, when the take-up axis 10 rotates, the aforesaid duplicated concave section (13, $15x$) moves to the lowermost position, causing a bar material a to fall downwards. At this time, however, the tube 36 is not closed by the aforesaid oscillation preventing plate 29, as described later on. In the meantime, the next bar material a moves to the lowermost position on the rail 6, though it is prevented by the outer circumference of the boss 11 from entering other concave sections of the plate cam 14. Moreover, when the convex section of the cam 33 fixed on the axis 10 presses the arm 28 downwards against the spring 30, the tube 35 is closed. And then, when the lever 24 causes the microswitch 25 to operate, the motor M1 stops, and the lever 24 comes into contact with the microswitch 26, causing the detachment motor M3 to operate. Subsequently, the machined bar a introduced into the hollow section 36 of the tube 35 as will be described later on is ejected as the remaining material and comes into contact with the microswitch 25, causing the motor M1 to start. In addition to this, a means to be described later on causes the axis 31 to operate, and the operating piece 32 and the operating lever 307 operate, so that the operating lever 307 is disengaged from the concave section 301 on the base of the operating arm 28 and the operating arm 28 and the oscillation preventing plate 29 open the tube 36 by the spring 30. In the meantime, a bar material M is sent again by the mechanism to take out a bar material and falls from the upper section of the tube 36.

Then, the pusher of a bar material shall be described by the help of FIGS. 5, 6 and 7. What is represented throughout by 40 is a pusher consisting mainly of a push rod 44, which is reciprocatably inserted into the hollow section 36 of the above-mentioned tube 35. Thus, the hollow section 36 serves as the guide section of a bar material $a$ and the pusher 40. 61 is a rear axis coupled with the rear section of the push rod 44, and a concave section 62 is provided in a portion thereof. 63 is a chain connector which stops both ends of a chain 66 to be described later on, and 64 and 65 are convex sections in two stages provided in the vicinity thereof. The aforesaid chain 66 is hung on the front sprocket 74 and the rear sprocket 191, as shown in FIG. 1, and it is driven to turn forwards or backwards by the sending motor M2 mounted in the vicinity of the aforesaid control mechanism 102. As the sending motor M2, a servomotor is used.

In the screw section 54 provided in the front section of the push rod 44, two groove sections 56 are provided in the axial direction. A cylindrical lock piece 43 can be fitted on the screw section 54, two protruding sections 58 protruding forwards are provided at the front end of the lock piece 43, and protruding sections 59 further protruding inwards from the protruding sections 58 can be engaged with the aforesaid groove section 56. A spring 60 is inserted between the lock piece 43 and the push rod 44. On the rear end face of a joint section 42, a notch section 57 which can be engaged with the aforesaid protruding sections 58 is provided. A through hole 50 of a small diameter is formed in the front section of the joint section 42, and a through hole 50' of a large diameter is formed in the rear section in connection with the through hole 50 of a small diameter to allow the aforesaid screw section 54 to be inserted thereinto. A connecting rod 47 runs through the through hole 50, the head section 51 of a large diameter thereof being rotatably stopped at the stage section formed between the through holes 50 and 50', and it is so assembled that a ball 53 may be held between the concave section 52 provided in the head section 51 and the concave section 55 provided at the end of the screw section 54 of the push rod 44 and suppressed in an appropriate way by means of a spring 60 at the same time. 41 is a finger section, the front section thereof being provided with a concave section 41' which is formed so as to allow a bar material $a$ to be fitted, and a fork end 46 is formed by two longitudinal grooves 56, an end of the connecting rod 47 being inserted into the hole 48 provided at the rear end thereof to be coupled with the finger section 41 by means of a pin 49.

It is clear that the following can be understood from the above description. In the conventional type of pusher, the push rod 44 and the joint section 42 would have been directly connected by a screw. Because there are two directions of clockwise and anticlockwise revolutions of the spindle of an automatic machine tool, the direction wherein a screw is made had to be taken into consideration. That is, if a screw has an inappropriate direction, it will be loosened. Therefore, it has been necessary to prepare two sets of pushers for clockwise and anticlockwise directions of a screw. In the present invention, the protruding sections 58 at the front end of the lock piece 43 are engaged with the notch section 57 of the joint section and pressed by the spring 60, and on the other hand, the protruding sections 59 are engaged with the groove section 56 of the push rod 44, when the push rod 44 and the lock piece 43 are combined with each other. Therefore, only one kind of pusher is enough in spite of the kinds of revolving directions of an automatic machine tool. Then, what is represented by 102 throughout in FIG. 8 and FIG. 9 is a control mechanism as described above. A gear 75 and a front sprocket 74 are mounted on the output axis 73 of the sending motor M2 which is mounted in the front section of the frame 3 through the intermediary of a flange 70. 76 is a plate which is fixed on the frame 3 by bolts 71, and 78 is another plate which is fixed on the plate 76 by a plural number of bolts 77. Shafts 81, 84 and 86 are provided between the plates 76 and 78. The shaft 81 is provided with a gear 79 and a gear 80 which are engaged with the aforesaid gear 75. The shaft 84 is provided with a gear 82 and a gear 83 which are engaged with the aforesaid gear 80. The shaft 86 is provided with a gear 85 which is engaged with the aforesaid gear 83, and further the shaft 86 is provided with arm clamps 87, 89 and 91 at an end thereof and arm clamps 96 and 98 at the other end thereof, the arm clamps 87, 89, 91, 96 and 98 being provided with contact arms 88, 90, 92, 97 and 99 respectively. On the plate 78, on the other hand, microswitches 93, 94 and 95 which are operated by the aforesaid contact arms 88, 90 and 92 are mounted, while on the plate 76, microswitches 100 and 101 which are operated by the aforesaid contact arms 97 and 99 are mounted. And the respective contact arms and the respective microswitches are so set that they operate once for every cycle of the sending motion of one bar material.

The following can be understood from the above description. When the sending motor M2 revolves, the front sprocket 74 rotates. Then, the chain 66 moves as described above, causing the rear sprocket 191 to rotate, and the pusher 40 moves along the sending tube 36 through the above-mentioned chain connector 63. On the other hand, the shaft 86 synchronously operates through the gear 75, gear 79, shaft 81, gear 80, gear 82, shaft 84, gear 83 and gear 85 of the control mechanism 102, so that the operation between each contact arm and each microswitch is performed in synchronism with the motion of the aforesaid pusher. The operation caused by the contact of each contact arm with each microswitch is as follows. However, the contact arm 88 and the microswitch 93 are used to operate attachments, so the description thereof shall be omitted in the present patent specification.

When the end of a machined bar M inserted into the finger section 41 of the pusher 40 has arrived at the machining starting position of a bar machine, and when the bar material has come into contact with the cutting-off tool and the stopper for determining the bar material position after having passed through the inside of the spindle of an automatic machine tool, the contact arm 90 is engaged with the switch 94, causing the clutch of the machine tool to be engaged to start machining, and then an instruction for changing over the sending torque of the sending motor M2 is issued. The switch 95 and the contact arm 92 which is engaged therewith are so set that the pusher 40 may advance to be engaged at the position of the machining limit of the bar material M. And when both the switch M3S which detects the release of the chuck of the automatic machine tool to be described later on and the aforesaid switch 95 operate, the sending motor M2 of the pusher 40 is reversed. When the contact arms 97 and 99 are engaged with the switches 100 and 101, a solenoid whereof illustration is omitted operates, causing the above-mentioned axis 31 to rotate, the arm 28 operates due to the above-mentioned process, causing the oscillation preventing plate 29 to open, and the sending tube 36 is opened. The oscillation preventing plate 29 closes the sending tube 36.

Figure 10:
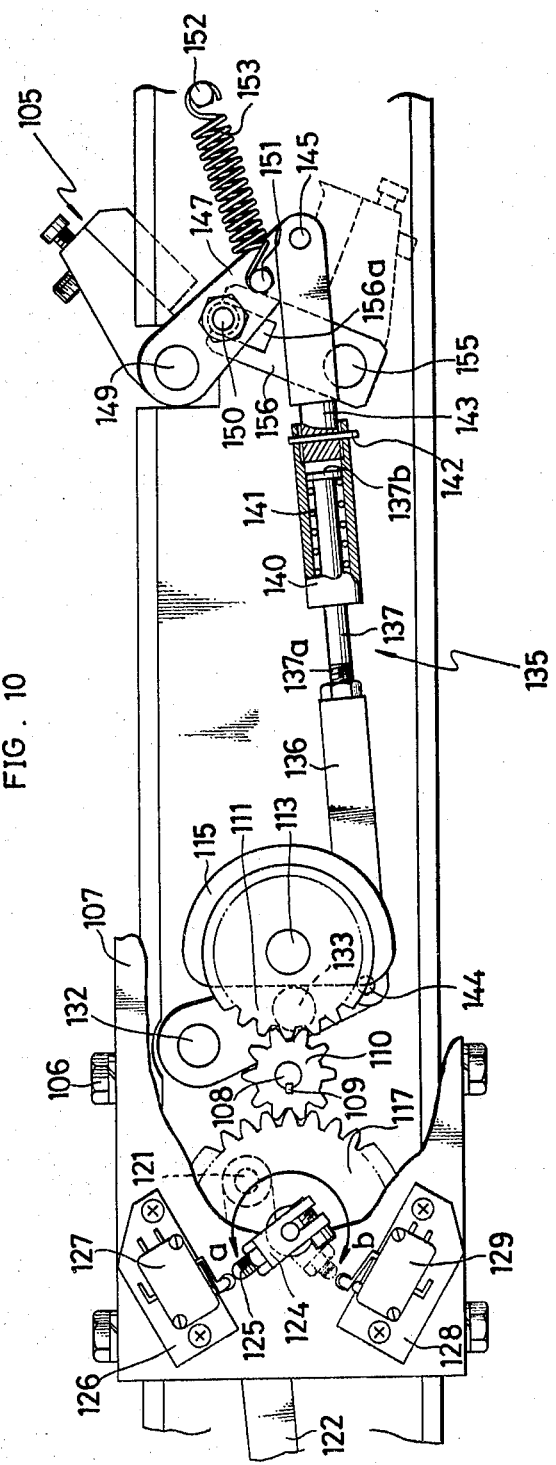
FIG. 10 and FIG. 11 are respectively an enlarged front sectional view and an enlarged top sectional view which illustrate the detail of the structure for driving the detaching mechanism.
Figure 11:
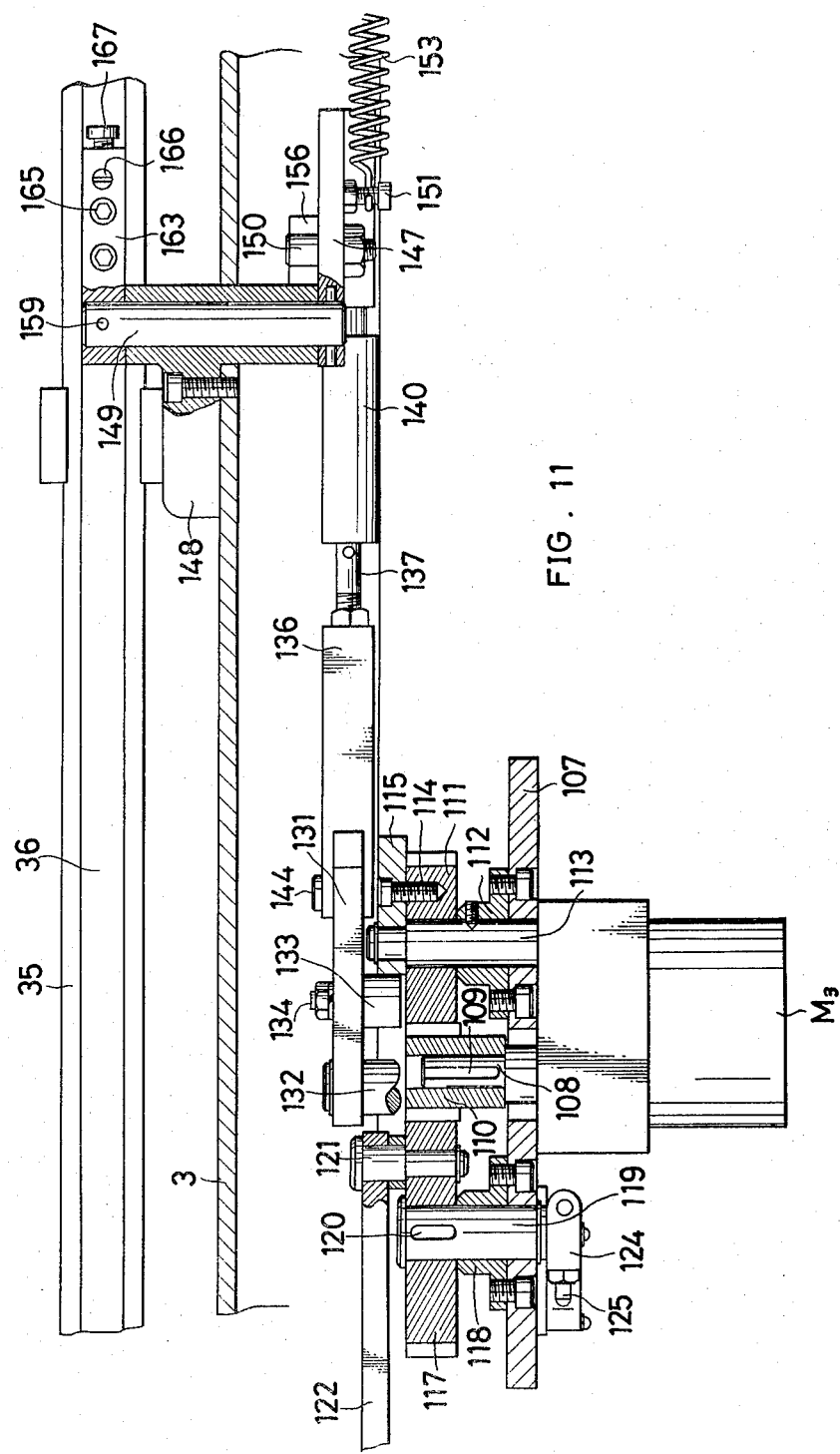

Then, the mechanism which connects a material with the pusher or separates the pusher from the remaining materials, namely, the so-called material holding-/releasing mechanism 105 shall be described in the following. With reference to FIG. 10 and FIG. 11, M3 is a motor with a reduction gear, 106 is a bolt equipped in the motor bracket 107 fixed on the frame 3, and 108 is an output axis, which is provided with a gear 110. 111 is a gear rotatably on the fixed axis 113 which is fixed on the motor bracket 107 by a bearing 112. The gear 111 is engaged with the gear 110. 115 is a plate cam which is mounted on the gear 110 by a screw 114. 117 is a gear fixed by a key 120 on the rotary axis 119 which is provided on the motor bracket 107 by a bearing 118. The gear 117 is engaged with the gear 110, too. And end of the connecting rod 122 is fixed by a pin 121 in the eccentric position of the body of the gear 117. The connecting rod 122 is used, as described later on, to operate the mechanism which allows the pusher to reciprocate. 131 is a swing arm, the base thereof being fixed on the frame 3 by an axis pin 132, and a roller 133 is rotatably provided through a pin 134 in a portion thereof. And the roller 133 is in contact with the aforesaid plate cam 115.

What is generally represented by 135 is a structure which is connected with the mechanism 105 to hold or release a material and consists of a joint 136, a rod 137, a spring case 140, a joint 143 and the like, an end of the joint 136 being rotatably connected with the end of the swing arm 131 by a pin 144 and the other end thereof being provided with a screw hole and connected the screw section 137a of the rod 137 in a way that the length can be adjusted. The jaw 137b at the end of the rod 137 can slide into the hollow section formed in the spring case 140, and it is equipped with a spring 141. The screw section 137a of the rod 137 and the screw hole of the joint 136 are adjustably fitted to each other, and the pressure of the spring 141 can be adjusted. 142 is a connecting pin between the joint 143 and the spring case 140, and the pin 145 is a pin rotatably connecting the joint 143 with the swing arm 147 to be described later on. 148 is a bearing section which is provided in the frame member 3, 149 is a rotary axis which is rotatably supported by the bearing section 148, and the pin 158 is a pin which stops the swing axis 147 and the rotary axis 149. 150 and 151 are bolts which are provided in the body of the swing arm 147, and 153 is a spring which is tensioned between the bolt 152 fixed on the frame member 3 and the aforesaid bolt 15. Therefore, the spring 153 functions so as to bring the roller provided on the aforesaid swing arm 131 into constant contact with the aforesaid plate cam 115 by constantly pulling the swing arm 147 to the right direction in FIG. 11, and at the same time, it acts so as to hold the mechanism 105 to hold or release a material constantly in the release state.

163 is an upper arm fixed at the other end of the rotary axis 149 by a pin 159, a guide 164 being mounted on the lower face thereof by a bolt 165. 166 is an upper pawl inserted into a unnumbered hole which is provided in the guide 164, and its protrusion can be adjusted by a set screw 167. 155 is a rotary axis which is rotatably supported by the lower section 148b of the bearing body 148, a lever 156 being fixed by a pin 160 at an end of the rotary axis 155, and a through concave section 156a provided on the other side of the lever 156 being engaged with the aforesaid pin 150. 168 is a lower arm which is fixed at the other end of the rotary axis 155 through a pin 161, a lower pawl 171 being inserted into an unnumbered hole on the upper face thereof and fixed by a set screw 172 so that its protrusion can be adjusted. And the guide 164 and the upper pawl 166 which are provided on the upper arm 163 can enter the hollow section 36 of the aforesaid sending tube 35 from the top of the sending tube 35, while the guide 169, the lower pawl 171 and the like which are provided on the lower arm 168 can enter the hollow section 36 through a hole (whereof illustration is omitted) which is provided in the bottom of the sending tube 35.

Then, 127 and 129 are microswitches which are provided in the upper and lower sections of the bracket 107 and used for stopping the motor M3. 126 and 128 are switch bases. 124 is an arm clamp which is provided at an end of the aforesaid rotary axis 119, and 125 is a contact arm which is provided on the arm clamp 124.

The following can be understood from the above description. When the detachment motor M3 revolves, the output axis 108 and the gear 110 simultaneously rotate. Then, the gear 117 and the rotary axis 119 rotate, and the arm clamp 124 and the contact arm 125 rotate. If the contact arm 125 turns anticlockwise (as marked with the arrow (b)) (FIG. 10), causing the microswitch 127 to operate, when the gear 110 turns clockwise, then the motor M3 stops. On the contrary, if the contact arm 125 turns clockwise, namely, in the direction of the arrow (b) and the detachment motor M3 revolves in the direction of the arrow b and comes into contact with the contact arm 129 when the gear turns anticlockwise, then the motor M3 stops. On the other hand, if the gear 117 rotates, the eccentric motion of the pin 121 causes the connecting rod 122 to operate, so that the reciprocating motion of the pusher to be described later on is performed.

In addition to this, if the gear 110 rotates, then the gear 111 rotates, the plate cam 115 which is mounted on the gear 111 rotates, the swing arm 131 swings around the axis pin 132 through the roller 133, and the swing arm 147 rotates through the pin 145 around the rotary axis 149.

With reference to FIGS. 14 and 15, 180 and 181 are holders which are provided in the vicinity of the rear end section of the sending tube 35, 182 is a rod which is slidably provided on the sending tube holders 180 and 181, and 183 is a bush plate which is fixed on the frame 3 by a screw 189. 188 is a block which is fixed on the rod 182 by a screw, and 177 is an engaging piece which is mounted on the block 188 by the pin 178 and can be detached from the concave section 62 provided in the rear axis 61 of the pusher 40. 176 is a lever which is integrally mounted at an end of the pin 178, and 175 is a stopper mounted on the frame 3, being provided in a position allowing it to be detached from the aforesaid lever 176. 184 is a spring provided on the lever 176, which is reinforced so that it can rotate anticlockwise in FIG. 14. 179 is a longitudinal long hole which is provided in the bottom of the hollow section 36 of the sending tube 35. 186 is a joint block which is fixed on the rod 182 by a screw 187, and 201 is a notch section which is provided on the frame 3, which allows the aforesaid joint block 186 to slide. A rod 195 is integrally provided at an end of the joint block 186, and the rod 195 can slide on the bearing 194 which is provided on the frame 3. And a block 197 is provided at the left end of the rod 195, and the pin 198 which is provided in the block 197 is fitted to the long hole (whereof illustration is omitted) which is provided in the above-mentioned connecting rod 122 (FIG. 10 and FIG. 11).

202 is a bearing provided at the rear end of the frame member 3 to support an axis 301 rotatably, the adjust lever 203 of the operating piece being fastened to one end and arm clamps 205 and 206 to the other end. 207 and 208 are contact arms which are fixed to the arm clamps 205 and 206 by screws. 204 is an operating piece which is fixed to the adjust lever 203 by a screw, and it can be pushed up by the aforesaid protruding sections 64 and 65 which are provided on the rear axis 61 of the pusher 35. Accordingly, when the operating piece 204 is pushed up by the aforesaid protruding sections 64 and 65, an axis 310 rotates, and the contact arms 207 and 208 rotate and come into contact with switches 209 and 210. 209 is a motor to start the sending motor M2, and 190 is a rear sprocket axis support fastened to the frame member 3 by a bolt 193, which is provided with a bearing 200. 192 is an axis provided with a rear sprocket 191, which is supported by the aforesaid bearing.

Then, the general operation according to the present invention shall be described in the following. The mechanism 2 for taking out a bar material, which is shown in FIGS. 3 and 4 has already been described in detail.

When the starting switch (whereof illustration is omitted) of the take-out motor M1 is depressed, a machined bar a which is held between the concave section 13 of the take-out plate boss 11 and the concave section 15x of the take-out plate cam 14 is taken out into the hollow section 36 of the sending tube 35 along the inside of the take-out guide 7. As soon as taking-out is completed, the oscillation preventing operating arm 28 which has been opened is closed by the arm 33. The concave sections 13 and 15x rise and hold the next bar material in the lowermost position among the machined bars a which have been arranged on the rail 6 of the tray 5. In the mean time, when the operating piece 24' operates the microswitch 26, the detachment motor M3 to be described later on is started, and when the switch operating piece 24 operates the microswitch 25, the circuit of the take-out motor M1 is opened to stop the motor M1.

When the motor M3 is started, the gear 110 rotates, and as mentioned above, the swing arm 147 rotates around the rotary axis 149. If it is assumed that this rotation is clockwise, the lever 156 engaged with the pin 150 which is fixed on the swing arm 147 rotates clockwise in conjunction, and the upper arm 163 and the lower arm 168 which are fixed on the rotary axis 149 and 155 respectively rotate and approximate to each other to hold and fix the machined bar M between the upper pawl 166 and the lower pawl 171.

The rotation of the gear 117 causes the connecting rod 122 to move forwards (to the left side in FIG. 14 and FIG. 15) gradually due to the eccentric motion of the pin, as described above, causing the rod 182 to move forwards, namely, to the left side through the block 197 and the joint block 186. In the connecting rod 122 which is omitted in the drawings, a long hole is provided and a pin 198 of the block 197 is fitted to this long hole, so the start of operation is a little later than the revolution of the gear 117. That is, because the aforesaid long hole whereof illustration is omitted has the function of the so-called time lag, 188 and the like of the mechanism to reciprocate the pusher are prevented from being reciprocated by the connecting rod 122 before the material holding mechanism 105 surely holds a bar material M. Accordingly, the rod 182 begins to advance forwards a little later than the rotation of the gear 117, namely, the start of the motor M3, and pushes the rear axis 61 of the pusher 40 by the push plate 183 to make the pusher 40 advance. Thus, the finger section 41 of the pusher 40 is engaged with the rear end of the machined bar a under the guide of the finger guides 164 and 169 to hold the bar material M.

When the motor M3 further revolves and the roller 133 comes into contact with the root section of the plate cam 115, the swing arm 147 rotates anticlockwise in FIG. 10 due to the action of the spring 153, and the upper pawl 166 and the lower pawl 171 retreat to release the bar material a. On the other hand, the rod 182 further advances, the lever 176 which is swingably mounted on the block 188 comes into contact with the stopper 175 to stand up, and at the same time, the engaging piece 177 is detached from the concave section 62.

When the engaging piece 177 is detached from the concave section 62, meanwhile, the contact between the convex section 64 of the rear axis 61 and the operating piece 204 is released, and the axis 310 rotates to operate the microswitch 209 and start the sending motor M2. With the rotation of the gear 117, in addition to this, the contact arm 125 rotates to come into contact with the microswitch 129, causing the detachment motor M3 to stop.

When the sending motor M2 is started, the pusher 40 pushes a new bar material M toward the stopper (the cutting-off tool) of the machine tool through the inside of the spindle of the machine tool.

When the sending motor M2 is started, the aforesaid control mechanism 102 operates on the other hand. When the shaft 86 rotates as described above, the contact arm 90 comes into contact with the microswitch 94 not only to change the sending torque of the sending motor M2 over to a weak torque corresponding to the diameter of the bar material but also to engage the cam shaft driving clutch for starting machining of the machine tool, and machining is started.

When bar materials M are sequentially machined and the machining limit is reached, the contact arm 92 comes into contact with the microswitch 95. The microswitch 95 and the collet chuck opening detaching switch MS3 (which is not shown in the drawings) operate simultaneously, the cam shaft of the machine tool stops at the position where the collet chuck is opened, the sending motor reverses at the same time, and the pusher 40 retreats to the right direction with the remaining material held. (FIG. 11) Meanwhile, when the pusher 40 retreats and the remaining material held by the finger section 41 arrives at the vicinity of the aforesaid upper pawl 166 and the lower pawl 171, the convex section 65 of the rear axis 61 of the pusher 40 pushes up the operating piece 204, so that the contact arm 208 operates the microswitch 210 to start the motor M3 (FIG. 15) and cause the gear 110 to rotate clockwise in FIG. 10. Meanwhile, the rear axis 61 of the pusher 40 is hindered by the push plate 183, the stopper 175 is disengaged from the lever 176 when the rod 182 moves to the right side in FIG. 14, and the engaging piece 177 rises and rotates due to the action of the spring 184 to be engaged with the concave section 62 of the rear axis 61 of the pusher 40. (FIG. 16b) In addition to this, the remaining material M' is held again by the upper pawl 161 and the lower pawl 171, and the connecting rod 122 which is mounted on the gear 117 further moves backwards, causing the pusher 40 to retreat through the rod 182, the engaging piece 177 and the engaging concave section 62 of the pusher 40.

At a position a little before the pusher 40 arrives at the backmost position, the remaining material M' is pulled out of the finger section 41 of the pusher 40. Further, when the gears 115 and 117 rotate and the roller 133 which is mounted on the swing arm 131 as shown in FIG. 16c comes into contact with the root section of the plate cam 115, the swing arm 147 rotates anticlockwise in FIG. 10 due to the action of the spring 153, and the upper pawl 166 and the lower pawl 171 release the remaining material.

When the pusher arrives at the backmost position, the convex section 64 of the chain connector which is mounted on the rear axis 161 pushes the operating piece 204 furthermore, and the contact arm 207 operates the microswitch 209 to stop the sending motor M2 which is continuing reversal driving. In addition to this, the detachment motor M3 stops when the contact arm 125 operates the microswitch 127.

Besides, when the remaining material M' falls onto a remaining material receiving box 217 through a remaining material chute 216, a microswitch 215 which is provided in the remaining material chute 216 detects the fall of the remaining material to drive the motor M1, and a new bar material M is introduced into the hollow section 36 of the sending tube 35. In the meantime, the contact arms 97 and 99 come into contact with the microswitches 100 and 101 so that the oscillation preventing plate 29 is sequentially released as described above. Subsequently, the operation described above is repeated.

The following can be understood from the above description. The control of the motion of the pusher is exceedingly facilitated by the present invention. For example, let us suppose a case where it is mounted on an automatic lathe of movable head stock type. In the case of a machine tool of this type, the chuck of the head stock is opened and the head stock retreats to seize a bar material and machines it while advancing a step in order to work the new piece. A switch is needed to detect the opening of the chuck of the head stock and to make the pusher to retreat. According to the conventional techniques, the pusher has been provided directly along the machine tool or the moving route of the pusher so as to be directly engaged with this switch. The position of the above-mentioned switch differs according to the length of products to be cut. That is, it is near to the head stock when the size of products is short, whereas it is far from the head stock when the size of products is long. With the above-mentioned construction according to the preceding techniques, it has been difficult to widely move the position of the aforesaid switch. Therefore, the conventional type of feeding apparatus has been used only when the length of products is small, whereas it has been impossible to use it when the length markedly differs from product to product. According to the present invention, on the other hand, the adjustment of the length of bar materials or the length of products is performed on a disc because the motion of the pusher, namely, that of bar materials is converted into a circular motion of one turn by the control device 102. Consequently, this adjustment is very easy and the application scope of the feeding apparatus can be expanded to a considerable degree.

I claim:

1. An automatic bar feeding apparatus which comprises a mechanism to take a new bar from a storage section to a guide section, a pusher movable reciprocably in the axial direction in the guide section, a driving motor which advances the pusher to push the bar to a machine tool and withdraws the pusher to a position where a new bar is taken into the guide section from the storage section, a holding mechanism operative to hold the bar when the pusher advances to connect with the end of the bar and when the pusher withdraws to detach from the remaining scrap portion of the bar, a finger which is rotatably joined to the pusher, said finger being adapted to hold and release the end of the bar, characterized by means for stopping said driving motor when said pusher is in predetermined position with respect to said holding mechanism, and a motive means connected to simultaneously operate both said holding mechanism and said movement of the pusher in the guide section when the pusher reaches said predetermined position in relation to said holding mechanism, said finger being rotatably coupled to a joint section, the said joint section having notch means on an end facing rearwardly of said finger, a lock piece disposed in confronting relation to said rearward end of said joint section, said lock piece having a front end with protrusion means configured to engage said notch means of said joint section, a threaded push rod extending forwardly at the end of said pusher and having a longitudinally extending groove, said lock piece being slidably received on said push rod with said protrusion means engaging said groove, means on said joint section threadedly engaging said threaded push rod, and spring means urging said lock piece forward for engagement of said protrusion means with said notch means.

2. An apparatus as in claim 1, characterized in that the aforesaid mechanism to take out a new bar comprises a plate cam mounted for rotation on an axis and having a number of concave apertures on the outer circumference of the plate cam, each of said concave apertures having a different diameter so as to accommodate bar stock of corresponding different diameters, a boss of substantially the same outer circumference as said plate cam and having on the circumference a concave aperture of diameter which is at least as large as the largest diameter of said concave apertures on said plate cam, and means selectively interconnecting said boss and said plate cam so that said concave aperture in said boss is aligned with a selected one of said apertures in said plate cam.

3. Apparatus as in claim 1, characterized in that said guide section includes a tube having an opening to receive a new bar from said bar taking mechanism, plate means mounted for selective positioning either to open said tube opening or to close said tube opening to retain a bar received therein, and operating means connected to said plate means and said bar taking mechanism to open said tube opening before said bar taking means operates to supply a bar to said tube and thereafter to close said tube opening when the bar has entered the tube.

* * * * *